US012739541B1

(12) United States Patent
Zhang et al.

(10) Patent No.: US 12,739,541 B1
(45) Date of Patent: Sep. 15, 2026

(54) COMMUNICATION IN MULTI-WAVELENGTH PASSIVE OPTICAL NETWORKS

(71) Applicant: Calix, Inc., San Jose, CA (US)

(72) Inventors: MingCai Zhang, Nanjing (CN); Tian Deng, Nanjing (CN); William Bittancourt, Santa Barbara, CA (US)

(73) Assignee: Calix, Inc., San Jose, CA (US)

( * ) Notice: Subject to any disclaimer, the term of this patent is extended or adjusted under 35 U.S.C. 154(b) by 328 days.

(21) Appl. No.: 18/390,280

(22) Filed: Dec. 20, 2023

(51) Int. Cl.
*H04J 14/02* (2006.01)
*H04B 10/25* (2013.01)
*H04Q 11/00* (2006.01)

(52) U.S. Cl.
CPC ......... *H04Q 11/0067* (2013.01); *H04B 10/25* (2013.01); *H04J 14/0227* (2013.01); *H04Q 2011/0073* (2013.01)

(58) Field of Classification Search
CPC . H04B 10/25; H04J 14/0227; H04Q 11/0067; H04Q 2011/0073
USPC .................................. 398/34, 48, 63, 68, 79
See application file for complete search history.

(56) References Cited

U.S. PATENT DOCUMENTS 6,657,952 B1 * 12/2003 Shiragaki ............ H04J 14/0283 370/223
6,661,972 B1 * 12/2003 Arecco .............. H04J 14/0283 398/79
6,717,909 B2 * 4/2004 Leroux ................... H04L 45/28 709/227
9,413,466 B2 8/2016 Boyd
2002/0030865 A1 3/2002 Kawate et al.
2003/0169470 A1 * 9/2003 Alagar ................ H04J 14/0291 398/5
2005/0031345 A1 * 2/2005 Sharma ............... H04J 14/0283 398/45
2005/0084262 A1 * 4/2005 Oberg ................ H04J 14/0209 398/19
2005/0180316 A1 * 8/2005 Chan ................... H04J 14/0291 370/216
2006/0115266 A1 * 6/2006 Levi .......................... H04L 1/22 398/19

(Continued)

FOREIGN PATENT DOCUMENTS

CN 105281986 A * 1/2016

OTHER PUBLICATIONS

U.S. Appl. No. 18/390,161, filed Dec. 20, 2023, by Zhang et al.

(Continued)

*Primary Examiner* — Li Liu
(74) *Attorney, Agent, or Firm* — Shumaker & Sieffert, P.A.

(57) ABSTRACT

A system for passive optical network (PON) communication includes an optical network terminal comprising one or more memories configured to store routing policy information, and processing circuitry coupled to the one or more memories and configured to: receive a set of information from a subscriber device; determine a priority level of the set of information based on the routing policy information; select a first PON protocol from a plurality of PON protocols based on the priority level of the set of information for transmission of the set of information; and cause transmission of the set of information on a fiber optical link in accordance with the first PON protocol.

15 Claims, 11 Drawing Sheets

(56) References Cited

U.S. PATENT DOCUMENTS

| | | | | |
|---|---|---|---|---|
| 2009/0214209 | A1* | 8/2009 | Ozaki ................ | H04Q 11/0067 398/58 |
| 2011/0103792 | A1* | 5/2011 | Kimura ............. | H04Q 11/0067 398/2 |
| 2014/0059158 | A1* | 2/2014 | Chen .................. | H04L 67/1076 709/213 |
| 2014/0199062 | A1 | 7/2014 | In De Betou et al. | |
| 2019/0089463 | A1* | 3/2019 | Zhang ................. | H04B 10/272 |

OTHER PUBLICATIONS

Notice of Allowance from U.S. Appl. No. 18/390,161 dated Jan. 7, 2026, 9 pp.

Notice of Allowance from U.S. Appl. No. 18/390,161 dated Apr. 10, 2026, 7 pp.

* cited by examiner

COMMUNICATION IN MULTI-WAVELENGTH PASSIVE OPTICAL NETWORKS

TECHNICAL FIELD

This disclosure relates to networking, and more particularly, communication between an optical network interface device and an optical line terminal (OLT) in an optical network.

BACKGROUND

Network interface devices permit a subscriber to access a variety of information via a network. A passive optical network (PON), for example, can deliver voice, video and data among multiple network nodes, using a common optical fiber link. Passive optical splitters and combiners enable multiple network interface devices such as optical network terminals (ONTs), also referred to as optical network units (ONUs), to share the optical fiber link. Each network interface device terminates the optical fiber link for a residential or business subscriber, and is sometimes referred to as a subscriber premises node that delivers Fiber to the Premises (FTTP) services.

In some systems, an ONT is connected with wiring to one or more subscriber devices in the subscriber premises, such as televisions, set-top boxes, telephones, computers, or network appliances, which ultimately receive the voice, video and data delivered via the PON. In this manner, the ONT can support delivery of telephone, television and Internet services to subscriber devices in the subscriber premises.

DETAILED DESCRIPTION

Figure 1A:
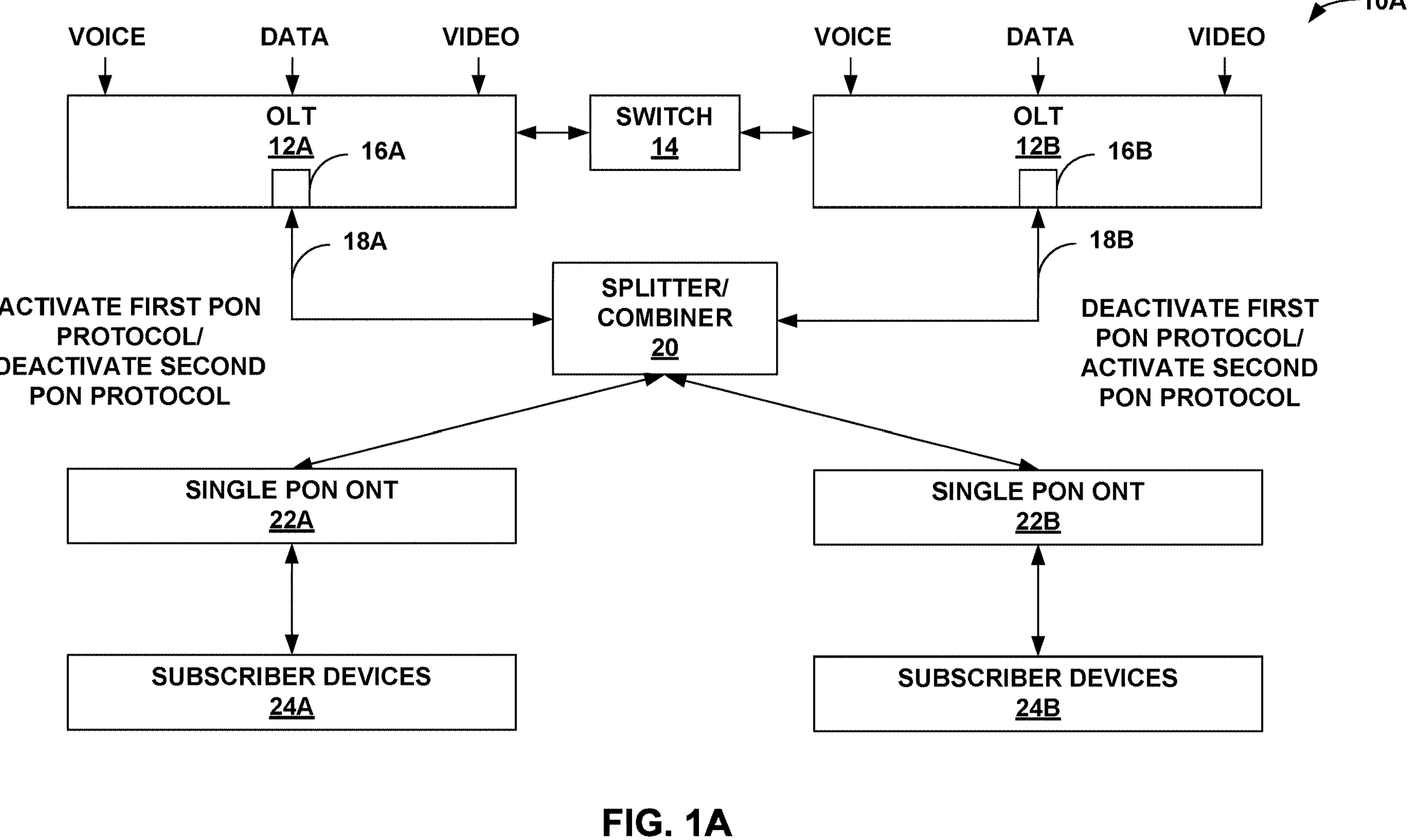
FIGS. 1A and 1B are block diagrams illustrating an example system for passive optical network (PON) communication.

An optical network includes one or more optical line terminals (OLTs), one or more optical splitter/combiners, and a plurality of network interface devices such as optical network terminals (ONTs). An OLT connects to an optical splitter/combiner with a fiber link, and one or more of the ONTs connect to the optical splitter/combiner with respective fiber links. In other words, there is a fiber link from the OLT to the optical splitter/combiner, and a plurality of fiber links (a fiber link for each ONT) from the optical splitter/combiner to the ONT.

For downstream transmission, the OLT outputs an optical signal to the optical splitter/combiner, and the optical splitter/combiner transmits the optical signal to each ONT via respective fiber links. Each of the ONTs determine whether the received optical signal is addressed to it or to another ONT. The ONTs process the optical signal when the optical signal is addressed to it.

For upstream transmission, each ONT transmits a respective optical signal to the optical splitter/combiner, and the optical splitter/combiner combines the optical signal for transmission to the OLT. Each ONT may reside at a subscriber premises, or a plurality of subscriber premises may share a common ONT. Each ONT receives data from devices at one or more subscriber premises, converts the received data into the optical signal, and outputs the optical signal to the OLT via respective fiber links and the optical splitter/combiner.

To ensure reliable, uninterrupted services, there may be two or more OLTs in the PON. In this example configuration, under normal conditions, a first OLT provides an active communication link to the ONTs, while a second OLT provides a standby, redundant communication link to the ONTs. In the event of a communication failure (e.g., fiber cut, failure at the first OLT, etc.), the second OLT steps in, and the standby communication link becomes the active communication link. Such a configuration is referred to as active-standby configuration, where a port on the first OLT is active, while a port on the second OLT is in standby.

This disclosure describes example techniques of utilizing multi-PON transceivers, also called multi-PON modules (MPMs) to provide for an active-active configuration that better utilizes OLT capacity. Multi-PON transceivers are pluggable optics that can support multiple PON protocols on a fiber optical link. A PON protocol refers to upstream and downstream wavelengths on which the OLT and ONT communicate. Each of the different PON protocols may define (e.g., specify) a different upstream and/or downstream wavelength, and may also define a different bandwidth. For example, gigabit PON (GPON) protocol supports 2.5 Gbps downstream, and 1.25 Gbps upstream, and 10 gigabit symmetrical PON (XGS-PON) supports 10 Gbps downstream, and 10 Gbps upstream. G-PON and XGS-PON are two examples of the PON protocols. Other examples of the PON protocol include 10 gigabit PON (XG-PON), 50 gigabit PON (50G-PON), 100 gigabit PON (100G-PON), and coherent PON. Furthermore, the PON protocol do not need to be standards based.

The active-standby configurations function well for reliable service. However, because the port on the second OLT remains in standby, in normal conditions, and only active when there is a communication failure, there is a capacity underutilization. That is, the port of the second OLT remains idle most of time, and is therefore, underutilized.

With the techniques described in this disclosure, each OLT may include a respective multi-PON transceiver in respective ports. The multi-PON transceivers may be configured in an active-active configuration. In the active-active configuration, the first multi-PON transceiver, in the first OLT, is communicating using a first PON protocol, and the second multi-PON transceiver, in the second OLT, is communicating using a second PON protocol. In the event of a communication failure with the second multi-PON transceiver, the first multi-PON transceiver may communicate using the first PON protocol and the second PON protocol.

In this way, both the first multi-PON transceiver and the second multi-PON transceiver are actively communicating under normal conditions, and when there is a communication failure, the first multi-PON transceiver takes over the communication for both the first and second PON protocols. This achieves full utilization of network resources as both fibers and transceivers are active. The active-active configuration also provides higher capacity and redundancy compared to active-standby configurations.

Furthermore, there is load balancing across OLTs because during normal conditions, one OLT does not need to handle all communication. Communication using the first PON protocol is handled by the first multi-PON transceiver in the first OLT, while communication using the second PON protocol is handled by the second multi-PON transceiver in the second OLT. Accordingly, traffic is dynamically balanced across the multi-wavelength PON links based on traffic rules and policies. In case of failure on one link, traffic is switched over to the redundant active link.

In the above example, the OLTs includes multi-PON transceivers. In one or more examples, it may be possible for the ONTs to also include multi-PON transceivers. However, the ONTs including multi-PON transceivers is not necessary in every example.

In examples where the ONTs include multi-PON transceivers, the ONTs may be configured to communicate using two different PON protocols on the same fiber optical link or on different fiber optical links. Furthermore, the ONTs may be configured to selectively communicate using one of the PON protocols based on the desired bandwidth and priority of communication. For example, an ONT may store routing policy information. The ONT may select a first PON protocol from a plurality of PON protocols based on the priority level of a first set of information for transmission, and may select a second PON protocol from the plurality of PON protocols based on the priority level of a second set of information for transmission. If the priority level of the first set of information is greater than the priority level of the second set of information, the ONT may select the first PON protocol, which may have greater bandwidth than the second PON protocol. In some cases, each of the plurality of PON protocols support different bandwidths, and the routing policy information may indicate that information having relatively higher priority be transmitted using a PON protocol having a relatively higher bandwidth.

With the example techniques described in this disclosure, the PON system may support different types of redundancy. For instance, PON systems define a Type B redundancy and Type C redundancy. In Type B redundancy, both the first OLT and the second OLT are coupled to a splitter/combiner (e.g., 2:N splitter/combiner), and each of the ONTs is coupled to the splitter/combiner. In this case, if there is a fiber cut between the second OLT and the splitter/combiner, then the first OLT can take over the communication with the ONTs. However, if there is a fiber cut from the splitter/combiner to the ONT, then there may be issues with communication.

With Type C redundancy, there are two splitter/combiners, and the first OLT is coupled to the first splitter/combiner, and the second OLT is coupled to the second splitter/combiner. Each ONT is then coupled to both the first splitter/combiner and the second splitter/combiner. In this case, if there is a fiber cut between an ONT and the second splitter/combiner, there is still a path to the first OLT through the first splitter/combiner. The first OLT may then handle communication using multiple PON protocols.

Figure 1B:
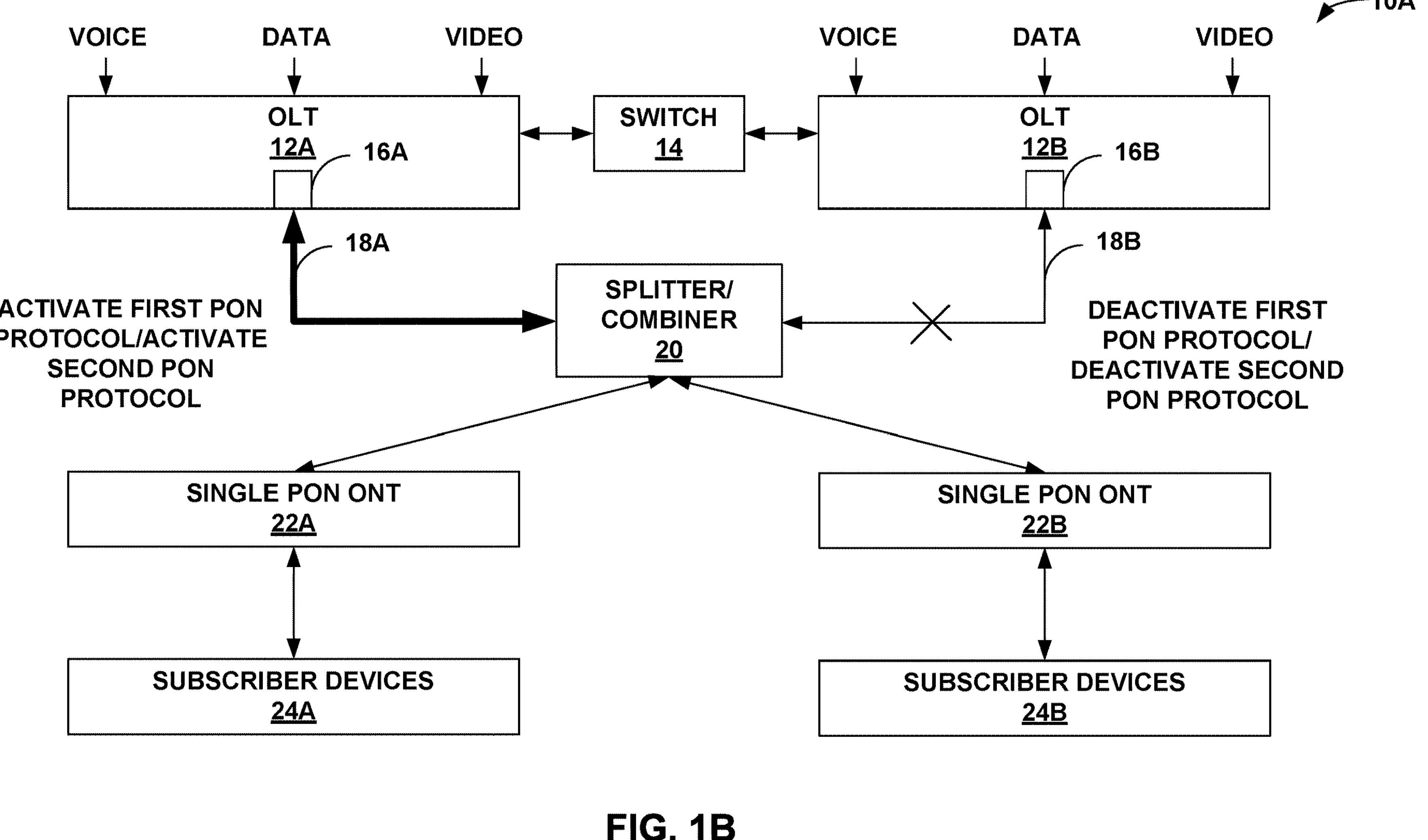

FIGS. 1A and 1B are block diagrams illustrating an example system 10A for passive optical network (PON) communication. For instance, system 10A may be referred to as PON 10A. As shown in FIGS. 1A and 1B, PON 10A may deliver voice, data and video content (generally "information") to a number of network nodes via optical fiber links. In some examples, PON 10A may be arranged to deliver Internet Protocol television (IPTV) and other high speed information (e.g., information transmitted at approximately 200 Mbps or higher). PON 10A may conform to any of a variety of PON standards, such as the broadband PON (BPON) standard (ITU G.983), Ethernet PON (EPON), the gigabit-capable PON (GPON) standard (ITU G.984), or 10 giga-bit NGPON, as well as future PON standards under development by the Full Service Access Network (FSAN) Group, such as 10G GPON (ITU G.987), or other organizations. Additional examples of PONs include 10 gigabit PON (XG-PON), 10 gigabit symmetrical PON (XGS-PON), 50 gigabit PON (50G-PON), 100 gigabit PON (100G-PON), and coherent PON.

In FIGS. 1A and 1B, optical line terminals (OLTs) 12A and 12B may receive voice information, for example, from the public switched telephone network (PSTN) via a switch facility. In addition, OLTs 12A and 12B may be coupled to one or more Internet service providers (ISPs) via the Internet and a router. As further shown in FIGS. 1A and 1B, OLTs 12A and 12B may receive video content from video content suppliers via a streaming video headend. Video and voice information also may be provided as packet video over the Internet.

OLTs 12A and 12B may be in the same location, or may be in different locations. Switch 14 may facilitate side-channel communication between OLTs 12A and 12B. As one example, OLTs 12A and 12B may be in the same location, and on a same server rack. Switch 14 may be part of the backplane of the server rack. In some examples, switch 14 may not be needed, and there may be a direct link between OLTs 12A and 12B. As one example, there may be a direct fiber link (e.g., where OLTs 12A and 12B are in different locations) or a direct electrical link (e.g., where OLTs 12A and 12B are in the same location). A direct fiber link may also be possible where OLTs 12A and 12B are in the same location. In the above examples, whether the connection between OLTs 12A and 12B is through switch 14 or a direct connection, the connection between OLTs 12A and 12B may be considered as a side-channel communication that does not require communication through PON 10A in all examples.

As illustrated, OLT 12A includes multi-PON transceiver 16A and OLT 12B include multi-PON transceiver 16B. Multi-PON transceivers 16A and 16B support multiple PON protocols on a fiber optical link (e.g., on one fiber). As described above, a PON protocol refers to upstream and downstream wavelengths on which the OLTs 12A and 12B and the ONTs, described below, communicate. Each of the different PON protocols may define a different upstream and/or downstream wavelength, and may also define a different bandwidth.

Multi-PON transceivers 16A and 16B may be pluggable into one of a plurality of ports on OLTs 12A and 12B, respectively. For instance, OLTs 12A and 12B each include a plurality of ports into which pluggable transceivers can be coupled. The multi-PON transceivers 16A and 16B may conform with a standardized module form factor, such as the small form-factor pluggable (SFP).

In one or more examples, while the other ports of OLTs 12A and 12B include respective pluggable transceivers, these pluggable transceivers, and their connections do not form part of PON 10A. That is, PON 10A may be considered as a connection of the ONTs of FIGS. 1A and 1B to respective ports of OLTs 12A and 12B. Other ports of OLTs 12A and 12B that do not couple to the ONTs may not form part of PON 10A. The same may apply to PON 10B described with respect to FIGS. 2A and 2B, and PON 10C described with respect to FIGS. 3A and 3B.

In the example of FIGS. 1A and 1B, multi-PON transceiver 16A is coupled to splitter/combiner 20 via fiber optical link 18A, and multi-PON transceiver 16B is coupled to splitter/combiner 20 via fiber optical link 18B. In one or more examples, multi-PON transceiver 16A supports multiple PON protocols (e.g., different upstream and downstream wavelengths) on fiber optical link 18A, and multi-PON transceiver 16B supports multiple PON protocols on fiber optical link 18B. That is, multi-PON transceiver 16A is configurable to communicate in accordance with a first PON protocol and in accordance with a second PON protocol on a same fiber optical link 18A (e.g., on the same one fiber). Similarly, multi-PON transceiver 16B is configurable to communicate in accordance with a first PON protocol and in accordance with a second PON protocol on a same fiber optical link 18B.

Multi-PON transceiver 16A and multi-PON transceiver 16B being configurable to communicate in accordance with a first PON protocol and in accordance with a second PON protocol on a same fiber optical link 18A (e.g., on the same one fiber) or same fiber optical link 18B, respectively, may mean that multi-PON transceiver 16A and multi-PON transceiver 16B have the capability, without circuitry modification and in operation, to communicate in accordance with the first PON protocol and the second PON protocol. Stated another way, multi-PON transceiver 16A includes circuitry that is capable of communicating, and can be set to communicate, in accordance with different PON protocols on the same fiber optical link 18A. Also, multi-PON transceiver 16B includes circuitry that is capable of communicating, and can be set to communicate, in accordance with different PON protocols on the same fiber optical link 18B.

Splitter/combiner 20 may be a 2:N splitter/combiner. For example, for downstream communication, splitter/combiner 20 receives transmission from multi-PON transceiver 16A and from multi-PON transceiver 16B, and splits the downstream communication for transmission to ONTs 22A and 22B. There may be more than two ONTs. For upstream communication, splitter/combiner 20 receives transmission from ONTs 22A and 22B, and combines the upstream communication for transmission to multi-PON transceivers 16A and 16B.

Each one of ONTs 22A and 22B may reside at or near a subscriber premises that includes one or more subscriber devices 24A and 24B. For instance, ONT 22A resides at or near a subscriber premises that includes one or more subscriber devices 24A, and ONT 22B resides at or near a subscriber premises that includes one or more subscriber devices 24B. The subscriber premises may be a home, a business, a school, or the like. A single ONT 22 may be capable of transmitting information to and receiving information from one or more subscriber premises.

As illustrated, a single ONT 22A or 22B may directly transmit information to or receive information from one or more subscriber devices 24A and 24B, respectively, within the subscriber premises. Examples of the subscriber devices 24A and 24B include, but are not limited to, one or more computers (e.g., laptop and desktop computers), network appliances, televisions, game consoles, set-top boxes, wireless devices, media players or the like, for video and data services, and one or more telephones for voice services. Subscriber devices 24A and 24B may also include household appliances such as furnaces, washer and dryers, freezers, refrigerators, thermostats, lights, security systems, and the like.

In FIGS. 1A and 1B, ONTs 22A and 22B are referred to as single PON ONT 22A and single PON ONT 22B. In FIGS. 1A and 1B, ONTs 22A and 22B may be configured to communicate in accordance with only one PON protocol. As an example, assume that ONT 22A is configured to communicate in accordance with only the GPON protocol, and ONT 22B is configured to communicate in accordance with only the XGS-PON protocol. That is, while OLTs 12A and 12B include multi-PON transceivers 16A and 16B, ONTs 22A and 22B may not include multi-PON transceivers, but may instead include single-PON transceivers. Examples of ONTs with multi-PON transceivers is described in more detail with respect to FIGS. 2A, 2B, 3A, and 3B.

FIG. 1A illustrates an example of a first configuration (e.g., a first operation mode) for OLTs 12A and 12B. For instance, FIG. 1A illustrates an example of a normal condition. In the normal condition, although multi-PON transceiver 16A can support multiple PON protocols, multi-PON transceiver 16A may activate a first PON protocol (e.g., activate/establish a first channel for communicating in accordance with the first PON protocol), and deactivate a second PON protocol (e.g., deactivate/not establish/terminate a second channel for communicating in accordance with the second PON protocol). That is, for multi-PON transceiver 16A, GPON communication (e.g., first PON protocol) may be active, but XGS-PON communication (e.g., second PON protocol) may be in standby. Similarly, in the normal condition, although multi-PON transceiver 16B can support multiple PON protocols, multi-PON transceiver 16B may activate a second PON protocol, and deactivate a first PON protocol. That is, for multi-PON transceiver 16B, GPON communication (e.g., first PON protocol) may be in standby, but XGS-PON communication (e.g., second PON protocol) may be active.

Which PON protocol multi-transceiver 16A activates (e.g., supports as active) and which PON protocol multi-transceiver 16A deactivates (e.g., keeps as standby), and which PON protocol multi-transceiver 16B activates (e.g., supports as active) and which PON protocol multi-transceiver 16B deactivates (e.g., keeps as standby) may be a load balancing determination by the broadband service provider (BSP) that owns or leases the use of OLTs 12A and 12B. For instance, the BSP may desire to load balance their PON traffic across their nodes into 'slow-path'/'fast-path' traffic. The BSP may have a lightly populated OLT (e.g., OLT 12A) and a more heavily populated OLT (e.g., OLT 12B) and the depending on how the BSP wants to balance the traffic the BSP can opt to direct traffic to a specific node. The population of the OLT may refer to the number of ONTs that OLT is supporting. This capability allows the BSP to more efficiently manage their network resources.

In this disclosure, multi-PON transceiver 16A activating the first PON protocol and deactivating the second PON protocol may mean that transmit circuitry (e.g., laser driver, lasers etc.) of multi-PON transceiver 16A that output optical signals in accordance with the first PON protocol are enabled, while transmit circuitry of multi-PON transceiver 16A that output optical signals in accordance with the second PON protocol are disabled (e.g., in standby). Multi-PON transceiver 16A may enable receive circuitry (e.g., photodiodes, trans-impedance amplifiers (TIAs)) used to receive optical signals in accordance with the first PON protocol, while disabling (e.g., keeping in standby) receive circuitry used to receive optical signals in accordance with the second PON protocol. In some examples, it may be possible for multi-PON transceiver 16A to enable both the transmit and receive circuitry for the first and second PON protocols to reduce turn on time, but filter out the optical signal transmitted in accordance with the second PON protocol and the output signal received in accordance with the second PON protocol. There may be other ways in which multi-PON transceiver 16A may activate the first PON protocol (e.g., activate a first channel for communicating in accordance with the first PON protocol) and deactivate the second PON protocol (e.g., deactivate a second channel to stop communicating in accordance with the second PON protocol), and the above are some examples.

Similarly, multi-PON transceiver 16B activating the second PON protocol and deactivating the first PON protocol may mean that transmit circuitry (e.g., laser driver, lasers etc.) of multi-PON transceiver 16B that output optical signals in accordance with the second PON protocol are enabled, while transmit circuitry of multi-PON transceiver 16B that output optical signals in accordance with the first PON protocol are disabled (e.g., in standby). Multi-PON transceiver 16B may enable receive circuitry (e.g., photodiodes, trans-impedance amplifiers (TIAs)) used to receive optical signals in accordance with the second PON protocol, while disabling (e.g., keeping in standby) receive circuitry used to receive optical signals in accordance with the first PON protocol. In some examples, it may be possible for multi-PON transceiver 16B to enable both the transmit and receive circuitry for the first and second PON protocols to reduce turn on time, but filter out the optical signal transmitted in accordance with the first PON protocol and the output signal received in accordance with the first PON protocol. There may be other ways in which multi-PON transceiver 16B may activate the second PON protocol (e.g., activate a first channel for communicating in accordance with the second PON protocol) and deactivate the first PON protocol (e.g., deactivate a second channel to stop communicating in accordance with the second PON protocol), and the above are some examples.

FIG. 1A illustrates a first configuration (e.g., first operation mode). In the first configuration, multi-PON transceiver 16A is configured to activate communication using the first PON protocol on fiber optical link 18A, and deactivate communication using the second PON protocol on the fiber optical link 18A. Also, in the first configuration, multi-PON transceiver 16B is configured to deactivate communication using the first PON protocol on the fiber optical link 18B, and activate communication using the second PON protocol on the fiber optical link 18B.

As an example, assume that the first PON protocol is the GPON protocol, and the second PON protocol is the XGS-PON protocol. Also, assume that ONT 22A is a GPON ONT (e.g., includes transceiver for GPON protocol), and ONT 22B is a XGS-PON ONT (e.g., includes transceiver for XGS-PON protocol). In this example, multi-PON transceiver 16A may transmit information in accordance with the GPON protocol that splitter/combiner 20 transmits to both ONT 22A and ONT 22B. However, because the information is not addressed to ONT 22B and does not conform to XGS-PON protocol, ONT 22B discards the received information, and ONT 22A processes the received information. Similarly, multi-PON transceiver 16B may transmit information in accordance with the XGS-PON protocol that splitter/combiner 20 transmits to both ONT 22A and ONT 22B. However, because the information is not addressed to ONT 22A and does not conform to GPON protocol ONT 22A discards the received information, and ONT 22B processes the received information. Accordingly, both multi-transceiver 16A and multi-transceiver 16B are active for downstream communication.

In the upstream, ONT 22A transmits information at times allocated to ONT 22A in accordance with the GPON protocol, and splitter/combiner 20 transmits the information to multi-PON transceiver 16A and multi-PON transceiver 16B. Because the information from ONT 22A is addressed to OLT 12A, OLT 12A process the information, while OLT 12B discards the information. Also, in the upstream, ONT 22B transmits information at times allocated to ONT 22B in accordance with the XGS-PON protocol, and splitter/combiner 20 transmits the information to multi-PON transceiver 16A and multi-PON transceiver 16B. Because the information from ONT 22B is addressed to OLT 12B, OLT 12B process the information, while OLT 12A discards the information.

In some examples, there may be a communication failure using one of the multi-PON transceivers 16A or 16B. For example, there may a failure of OLT 12A or 12B, a failure of multi-PON transceiver 16A or 16B, or a fiber cut of the fiber optical link 18A or 18B.

FIG. 1B illustrates a second configuration (e.g., a second operation mode). For instance, in the example of FIG. 1B, there is a communication failure using multi-PON transceiver 16B. In particular, there is a fiber cut on fiber optical link 18B. In this case, downstream communication to ONT 22B may not be possible using multi-PON transceiver 16B, and upstream communication from ONT 22B to OLT 12B using multi-PON transceiver 16 may not be possible.

In accordance with one or more examples described in this disclosure, in a second configuration, multi-PON transceiver 16A is configured to activate communication using the first PON protocol on the fiber optical link 18A, and activate communication using the second PON protocol on the fiber optical link 18A (e.g., on a unitary fiber). That is, multi-PON transceiver 16A may enable both the transmit and receive circuitry or enable use of both the transmit and receive circuitry for communicating in accordance with the first PON protocol and the second PON protocol. Stated another way, multi-PON transceiver 16A may activate a first channel for communicating in accordance with the first PON protocol on fiber optical link 18A, and activate a second channel for communicating in accordance with the second PON protocol on fiber optical link 18B. In one or more examples, in response to a communication failure using multi-PON transceiver 16B, OLT 12A may be configured to transition from the first configuration (e.g., as illustrated in FIG. 1A) to the second configuration (e.g., as illustrated in FIG. 1B).

There may be various ways in which to determine that there is a communication failure. As one example, OLT 12B may be configured to periodically transmit a signal to determine a number of ONTs with which OLT 12B is communicating. If OLT 12B does not receive a response within a set period of time, OLT 12B may determine that there is a communication failure.

As another example, ONT 22B may determine that ONT 22B is no longer receiving information. OLT 12A may be configured to periodically transmit signals using the first PON protocol and the second PON protocol (e.g., temporarily activating circuitry for the second PON protocol) to determine if there are ONTs with which OLT 12A should communicate. In response to such a signal, ONT 22B may reply to OLT 12A to setup a communication link because ONT 22B determined that there is a communication failure communicating with OLT 12B. There may be other ways in which to determine a communication failure, and the example techniques are not limited to the above examples.

If OLT 12B determines that there is a communication failure, OLT 12B may transmit connection information to OLT 12A through a side-channel connection via switch 14, so that OLT 12A can establish a communication session with ONT 22B. If ONT 22B determines that there is a communication failure, OLT 12A may request connection information from OLT 12B through the side-channel connection via switch 14. That is, OLT 12A and OLT 12B may store a database that is shared through the side-channel. The PON protocol handover is communicated through and side-channel and confirmed by OLT 12A and OLT 12B together. Accordingly, in the event of a communication failure, the corresponding ONTs (e.g., ONT 22B) are automatically switched to the alternate fiber optical link 18A to maintain uninterrupted and same quality of services. There may be other components in PON 10A that may be configured to detect and perform handover in the even of a communication failure, such as a controller that establishes routes for communication.

As an example, when fiber optical link 18B is cut, ONT 22B would not receive downstream signal from OLT 12B, and ONT 22B may stop the upstream transmission immediately. In this case, no upstream signal would be transmitted to multi-PON transceiver 16B and OLT 12B. As a result, OLT 12B may determine fiber 18B is cut and output a synchronization message to OLT 12A. OLT 12A may then open the second channel (e.g., XGS-PON), then ONT 22B synchronizes the second channel signal from OLT 12A and establish the communication with OLT 12A.

Because multi-PON transceiver 16A is configurable to (e.g., has the capability, including circuitry that can) communicate in accordance with the first PON protocol and in accordance with the second PON protocol on a same fiber optical link 18A, multi-PON transceiver 16A may being transmitting and receiving information using the first PON protocol for ONT 22A and the second PON protocol for ONT 22B. In this case, multi-PON transceiver 16B may deactivate the first PON protocol and deactivate the second PON protocol. That is, multi-PON transceiver 16B may deactivate a first communication channel to not allow communicating in accordance with the first PON protocol, and deactivate a second communication channel to stop communicating in accordance with the second PON protocol.

Accordingly, multi-PON transceiver 16A functions as a standby connection for ONT 22B when there is a communication failure, but also remains active when there is no communication failure by communicating with ONT 22A. Although the above example describes the case where there is a fiber cut on fiber optical link 18B, the same techniques would apply if there is a fiber cut on fiber optical link 18A where multi-PON transceiver 16B would activate both the first and second PON protocols, and multi-PON transceiver 16A would deactivate both the first and second PON protocols.

In this way, FIGS. 1A and 1B illustrate an example of a Type B redundancy, with an active-active configuration. Accordingly, service providers delivering premium services to PON subscribers from a single location or geographically-diverse locations for OLT 12A and 12B are able to leverage multi-PON optics to load balance network traffic across their OLTs. For instance, in normal operation (e.g., first configuration of FIG. 1A), OLT 12A communicates in accordance with the first PON protocol (e.g., GPON), and OLT 12B communicates in accordance with the second PON protocol (e.g., XGS-PON) where the service provider can balance the network traffic by partitioning the information for GPON or XGS-PON, as needed. Within these subscriber counts there will be different types of PON subscribers (e.g., ONT 22A is for the first PON protocol, and ONT 22B is for the second PON protocol). With the example illustrated in FIGS. 1A and 1B, having the Type B redundancy allows for seamless transition in case there is a communication failure, but with the active-active configuration, both multi-PON transceivers 16A and 16B are active when there is no communication failure.

The example techniques may also reduce the number of redundant, idle ports required by the BSP. For instance, if multi-PON transceivers 16A and 16B were not configurable to (e.g., did not have the capability to) communicate in accordance with a first PON protocol and in accordance with a second PON protocol on a same fiber optical link 18A or 18B, then there would be a redundant port on OLT 12A for communicating in accordance with the first PON protocol, and a redundant port on OLT 12B for communicating in accordance with the second PON protocol. These redundant ports would be idle except when there is a communication failure. With the example techniques, in normal condition when there is no communication failure, both multi-PON transceivers 16A and 16B are active.

In the examples of FIGS. 1A and 1B, OLT 12A includes a multi-PON transceiver 16A configurable to communicate (e.g., has the circuitry that makes transceiver 16A capable of communicating) in accordance with a first PON protocol and in accordance with a second PON protocol on a same fiber optical link 18A. In a first configuration (e.g., normal operation of FIG. 1A), the multi-PON transceiver 16A is configured to activate communication using the first PON protocol on the fiber optical link 18A, and deactivate communication using the second PON protocol on the fiber optical link 18A. In a second configuration (e.g., communication failure of FIG. 1B), the multi-PON transceiver 16A is configured to activate communication using the first PON protocol on the fiber optical link 18A, and activate communication using the second PON protocol on the fiber optical link 18A.

OLT 12B includes multi-PON transceiver 16B configurable to communicate (e.g., has the circuitry that makes transceiver 16B capable of communicating) in accordance with the first PON protocol and the second PON protocol on a same, second fiber optical link 18B. In the first configuration (e.g., normal operation of FIG. 1A), multi-PON transceiver 16B is configured to activate communication using the second PON protocol on fiber optical link 18B, and deactivate communication using the first PON protocol on the fiber optical link 18B. In the second configuration (e.g., communication failure of FIG. 1B), the multi-PON transceiver 16B is configured to deactivate communication using the first PON protocol and deactivate communication using the second PON protocol.

As an example, in response to a communication failure using the multi-PON transceiver 16B, the OLT 12A is configured to transition from the first configuration (e.g., of FIG. 1A) to the second configuration (e.g., of FIG. 1B). For instance, the communication failure may be one or more of a failure of the OLT 12B, a failure of multi-PON transceiver 16B, or a fiber cut of the fiber optical link 18B.

As illustrated, in the first configuration (e.g., of FIG. 1A), the multi-PON transceiver 16A is configured to communicate with a first ONT 22A in accordance with the first PON protocol and avoid communication with a second ONT 22B in accordance with the second PON protocol. In the second configuration (e.g., of FIG. 1B), the multi-PON transceiver 16A is configured to communicate with the first ONT 22A in accordance with the first PON protocol and the second ONT 22B in accordance with the second PON protocol. In the example of FIGS. 1A and 1B, the first ONT 22A is configured to communicate in accordance with only the first PON protocol (e.g., single PON ONT), and the second ONT 22B is configured to communicate in accordance with only the second PON protocol (e.g., single PON ONT).

FIGS. 1A and 1B illustrate an example way of providing Type B redundancy. For example, for the Type B redundancy, the first ONT 22A includes a first connection to splitter/combiner 20, and splitter/combiner 20 is coupled to the first OLT 12A. The second ONT 22B comprises a second connection to the splitter/combiner 20, and the splitter/combiner 20 is coupled to a second OLT 12B. Accordingly, if there is a communication failure, it is possible to switch corresponding ONT 22A or 22B to other of OLTs 12A or 12B, where multi-PON transceiver 16A or 16B communicates using two different PON protocols simultaneously or at least partially overlapping in time.

Figure 2A:
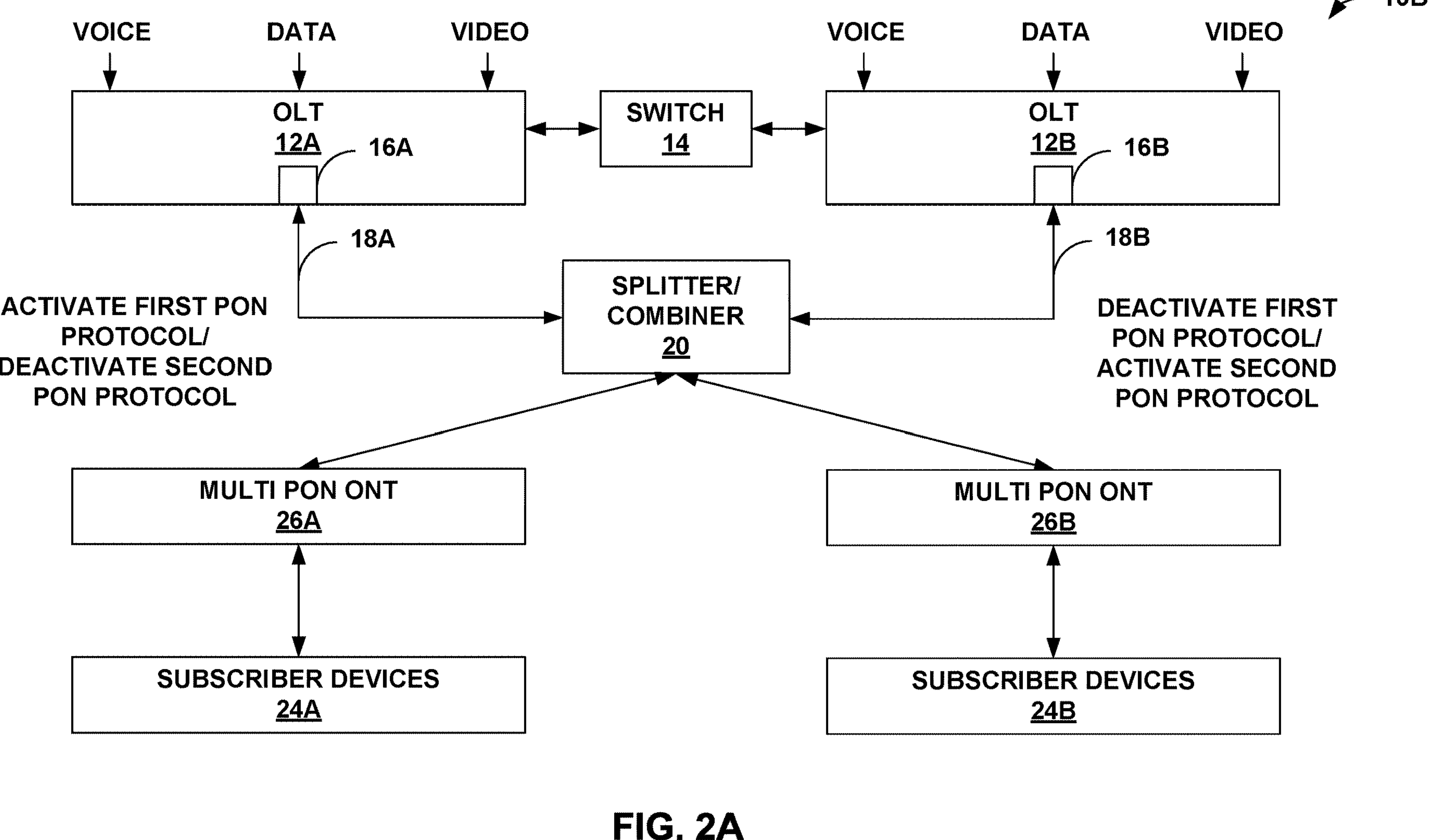
FIGS. 2A and 2B are block diagrams illustrating another example system for passive optical network (PON) communication.
Figure 2B:
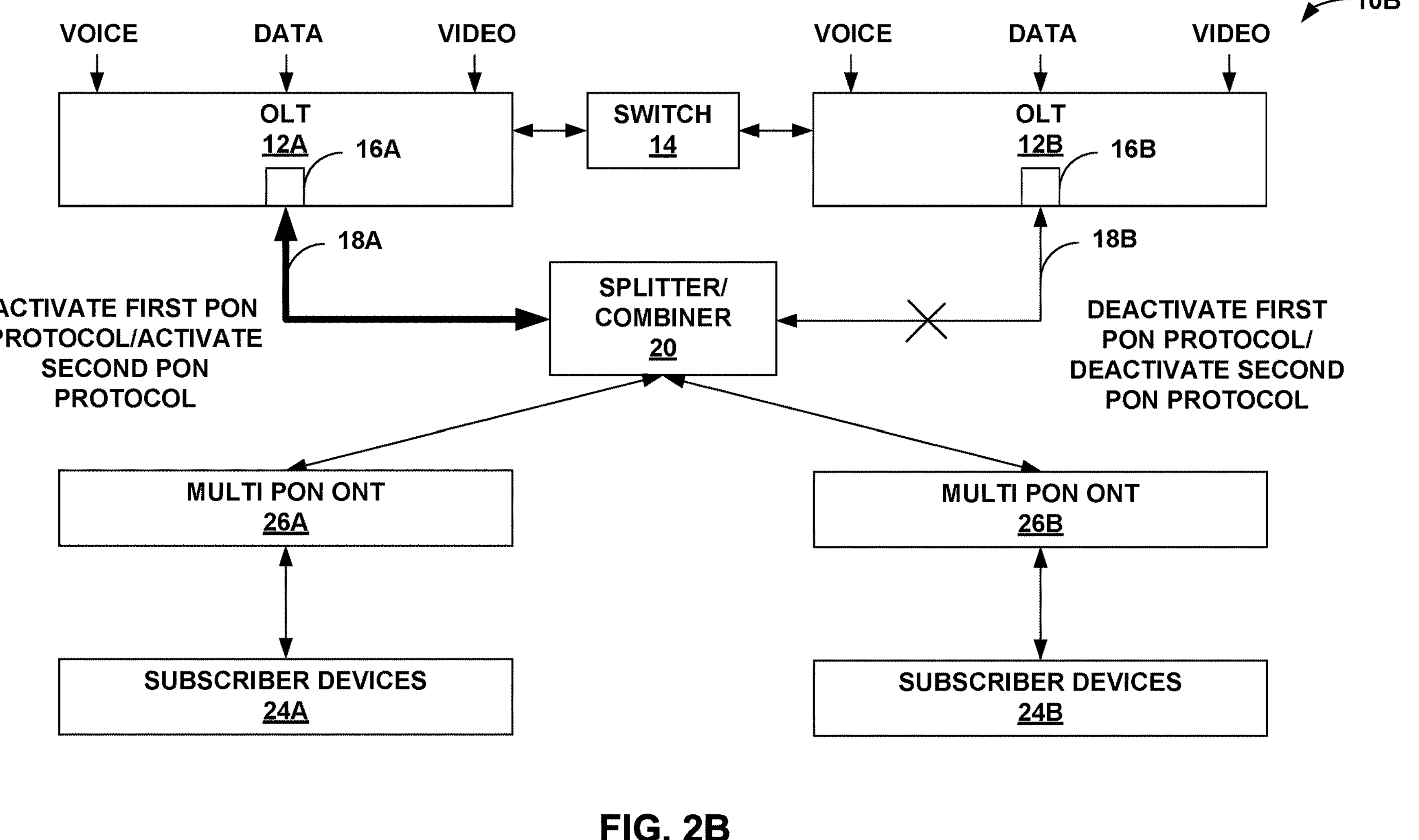

FIGS. 2A and 2B are block diagrams illustrating another example system for passive optical network (PON) communication. FIGS. 2A and 2B illustrate PON 10B. The example of FIGS. 2A and 2B are similar to FIGS. 1A and 1B, and same reference numerals are given to the same components. However, in FIGS. 2A and 2B, rather than having single PON ONTs 22A and 22B of FIGS. 1A and 1B, PON 10B includes multi-PON ONTs 26A and 26B. For instance, multi-PON ONTs 26A and 26B include multi-PON transceivers that are configurable to communicate in accordance with a first PON protocol and in accordance with a second PON protocol.

Multi-PON ONTs 26A and 26B may deliver fast-path and slow-path traffic to the OLT 12A and OLT 12B. Multi-PON ONTs 26A and 26B would be capable of the aggregate traffic speed between the PON protocols. For instance, assume that multi-PON ONTs 26A and 26B are both capable of communicating in accordance with the GPON protocol and the XGS-PON protocol simultaneously or at least partially overlapping in time. The GPON protocol supports 2.5 Gbps downstream, and the XGS-PON protocol supports 10 Gbps downstream. Therefore, multi-PON ONTs 26A and 26B would be able to receive information at 2.5 Gbps+10 Gbps downstream, for a total of 12.5 Gbps. The GPON protocol supports 1.25 Gbps upstream, and the XGS-PON protocol supports 10 Gbps upstream. Therefore, multi-PON ONTs 26A and 26B would be able to transmit information at 1.25 Gbps+10 Gbps downstream, for a total of 11.25 Gbps.

Multi-PON ONTs 26A and 26B may be capable of delivering services to MDUs (Multi-Dwelling Units), MTUs (Multi-Tenant Units), and businesses. For instance, there is bandwidth gain of using two different PON protocol wavelengths and the ability for route redundancy, similar to FIGS. 1A and 1B. For example, if there is a communication failure (e.g., fiber cut in fiber optical link 18B as illustrated in FIG. 2B), multi-PON ONT 26B would automatically switchover to OLT 12A and continue services. Multi-PON ONTs 26A and 26B are dual wavelength (e.g., support two PON protocols) but does so over a single fiber optical link to and from splitter/combiner 20.

Like FIGS. 1A and 1B, the example of FIGS. 2A and 2B provide network protection when there is a communication failure with fiber route protection and load balancing. For example, similar to FIGS. 1A and 1B, in FIGS. 2A and 2B, in a first configuration (e.g., normal operation of FIG. 2A), the multi-PON transceiver 16A is configured to activate communication using the first PON protocol on the fiber optical link 18A, and deactivate communication using the second PON protocol on the fiber optical link 18B. In a second configuration (e.g., communication failure of FIG. 2B), the multi-PON transceiver 16A is configured to activate communication using the first PON protocol on the fiber optical link 18A, and activate communication using the second PON protocol on the fiber optical link 18A. In the first configuration (e.g., normal operation of FIG. 2A), the multi-PON transceiver 16B is configured to activate communication using the second PON protocol on the second fiber optical link 18B, and deactivate communication using the first PON protocol on the second fiber optical link 18B. In the second configuration (e.g., communication failure of FIG. 2B), the multi-PON transceiver 16B is configured to deactivate communication using the first PON protocol and deactivate communication using the second PON protocol.

In the first configuration (e.g., of FIG. 2A), the multi-PON transceiver 16A is configured to communicate with a first ONT (e.g., multi-PON ONT 26A) in accordance with the first PON protocol and avoid communication with a second ONT (e.g., multi-PON ONT 26B) in accordance with the second PON protocol. In the second configuration, the multi-PON transceiver 16A is configured to communicate with the first ONT (e.g., multi-PON ONT 26A) in accordance with the first PON protocol and the second ONT (e.g., multi-PON ONT 26B) in accordance with the second PON protocol.

This way, PON 10C provides Type B redundancy. However, unlike FIGS. 1A and 1B, in FIGS. 2A and 2B, the first ONT (e.g., multi-PON ONT 26A) is configurable to communicate in accordance with the first PON protocol and the second PON protocol, and the second ONT (e.g., multi-PON ONT 26B) is configurable to communicate in accordance with the first PON protocol and the second PON protocol. Moreover, for the Type B redundancy, the first ONT (e.g., multi-PON ONT 26A) comprises a first connection to the splitter/combiner 20, and the splitter/combiner 20 is coupled to the first OLT 12A. The second ONT (e.g., multi-PON ONT 26B) comprises a second connection to the splitter/combiner 20, and the splitter/combiner 20 is coupled to a second OLT 12B.

In one or more examples, multi-PON ONT 26A may establish two active sessions with OLT 12A and with OLT 12B, and multi-PON ONT 26B may establish two active sessions with OLT 12A and OLT 12B For example, multi-PON ONT 26A may establish a GPON protocol session with OLT 12A and an XGS-PON protocol session with OLT 12B, to achieve the 12.5 Gbps downstream/11.25 Gbps upstream. Similarly, multi-PON ONT 26B may establish a GPON protocol session with OLT 12A and an XGS-PON protocol session with OLT 12B, to achieve the 12.5 Gbps downstream/11.25 Gbps upstream.

In the above examples, the load balancing is described from perspective of partitioning the PON protocol that OLT 12A and OLT 12B provide to load balance between OLT 12A and OLT 12B. However, in some examples, load balancing may also be performed with multi-PON ONTs 26A and 26B. Such example load balancing is described with respect to FIGS. 4A and 4B.

Figure 3A:
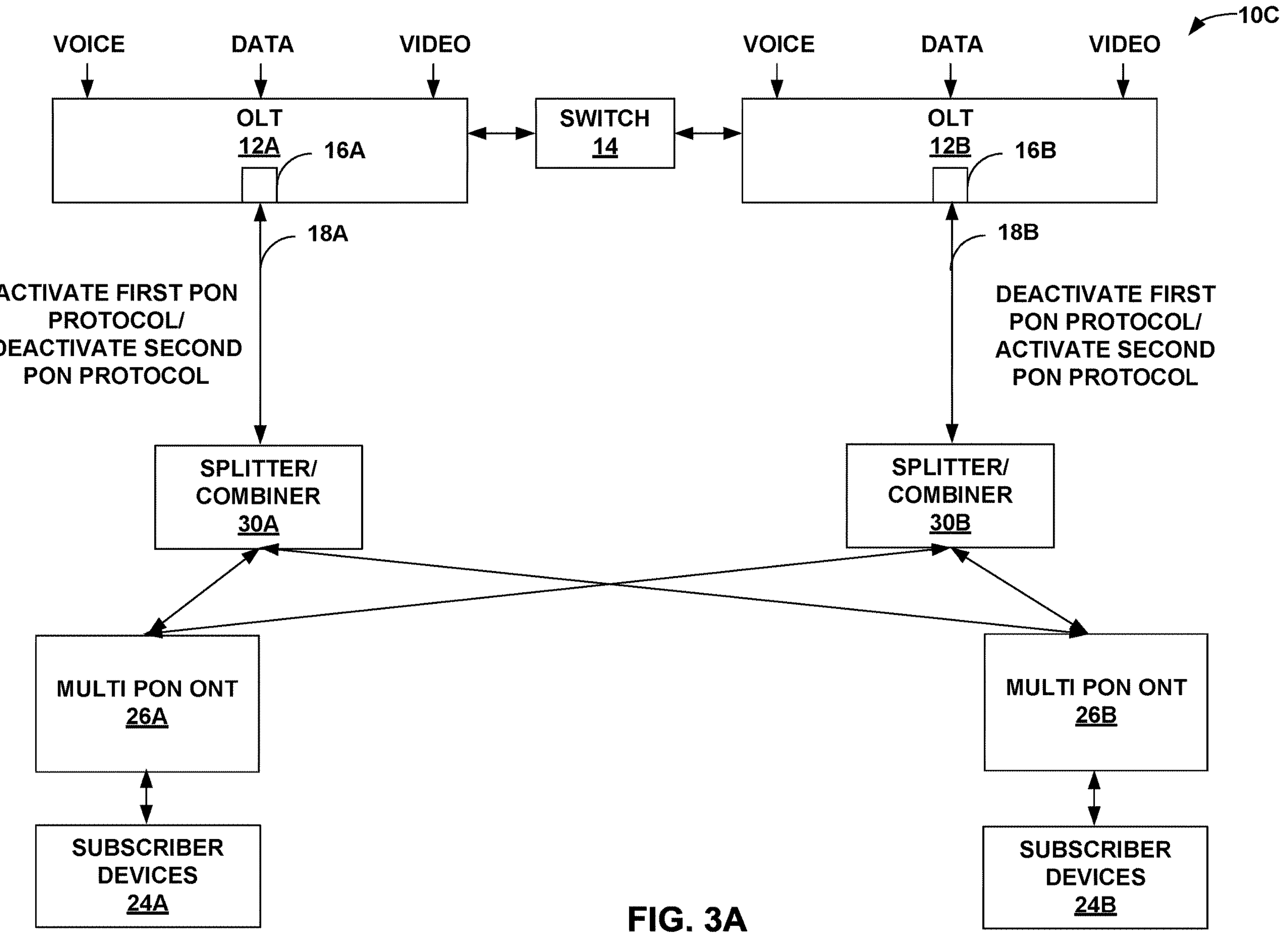
FIGS. 3A and 3B are block diagrams illustrating another example system for passive optical network (PON) communication.
Figure 3B:
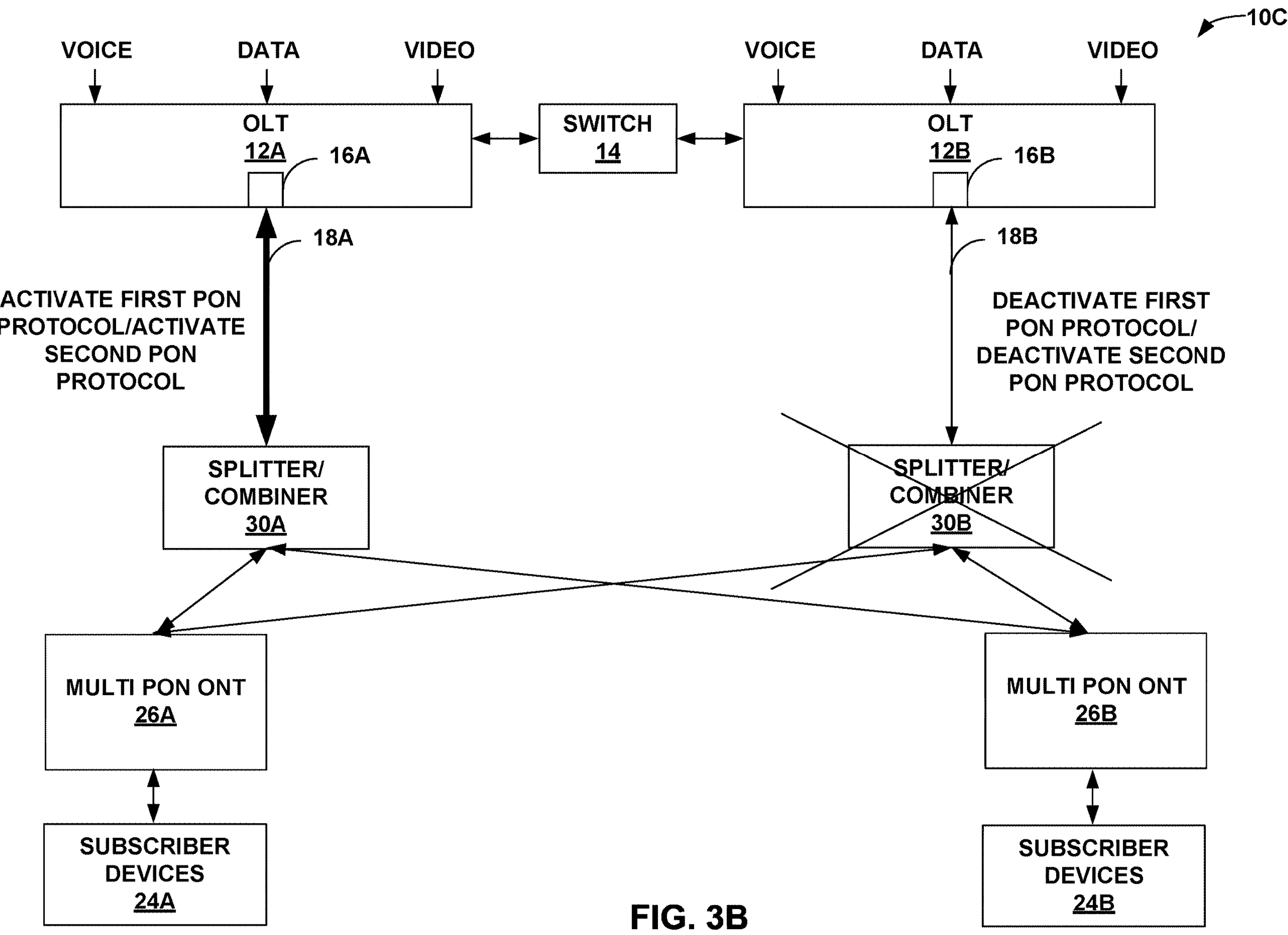

FIGS. 3A and 3B are block diagrams illustrating another example system for passive optical network (PON) communication. FIGS. 3A and 3B illustrate PON 10C, and are similar to FIGS. 1A and 1B and FIGS. 2A and 2B. However, FIGS. 3A and 3B illustrate an example of Type C redundancy. As illustrated, rather than having one splitter/combiner 20, like in FIGS. 1A, 1B, 2A, and 2B, in FIGS. 3A and 3B there are two splitter/combiners 30A and 30B.

Multi-PON ONT 26A includes two fiber optical links, one to splitter/combiner 30A and one to splitter/combiner 30B. Multi-PON ONT 26B includes two fiber optical links, one to splitter/combiner 30A and one to splitter/combiner 30B. For example, the first ONT (e.g., multi-PON ONT 26A) includes a first connection to the first splitter/combiner 30A and a second connection to the second splitter/combiner 30B. The second ONT (e.g., multi-PON ONT 26B) includes a third connection to the first splitter/combiner 30A and a fourth connection to the second splitter/combiner 30B.

Each of the two fiber optical links from multi-PON ONT 26A may carry information in accordance with the first PON protocol and the second PON protocol. Similarly, each of the two fiber optical links from multi-PON ONT 26B may carry information in accordance with the first PON protocol and the second PON protocol.

In the example of FIG. 3B, in the event of a communication failure (e.g., splitter/combiner 30B is defective), multi-PON ONT 26B may still be able to communicate using splitter/combiner 30A. In this way, in the Type C redundancy, there is additional redundancy, relative to Type B redundancy, that provides further protection in the event of a communication failure. For instance, even if there is a fiber cut further downstream from splitter/combiner 30B, both multi-PON ONTs 26A and 26B still have a path to OLT 12A through splitter/combiner 30A. However, if there is a fiber cut further downstream from splitter/combiner 20 to ONT 22B or 26B of FIGS. 1A, 1B, 2A, and 2B, there may be no path for ONT 22B or 26B to OLT 12A.

It should be understood that while FIGS. 3A and 3B illustrate Type C redundancy with multi-PON ONTs 26A and 26B, the example techniques are not so limited. In one or more examples, it may be possible to provide Type C redundancy with single PON ONTs 22A and 22B. For instance, single PON ONTs 22A and 22B may each include connections to splitter/combiner 30A and to splitter/combiner 30B.

Figure 4A:
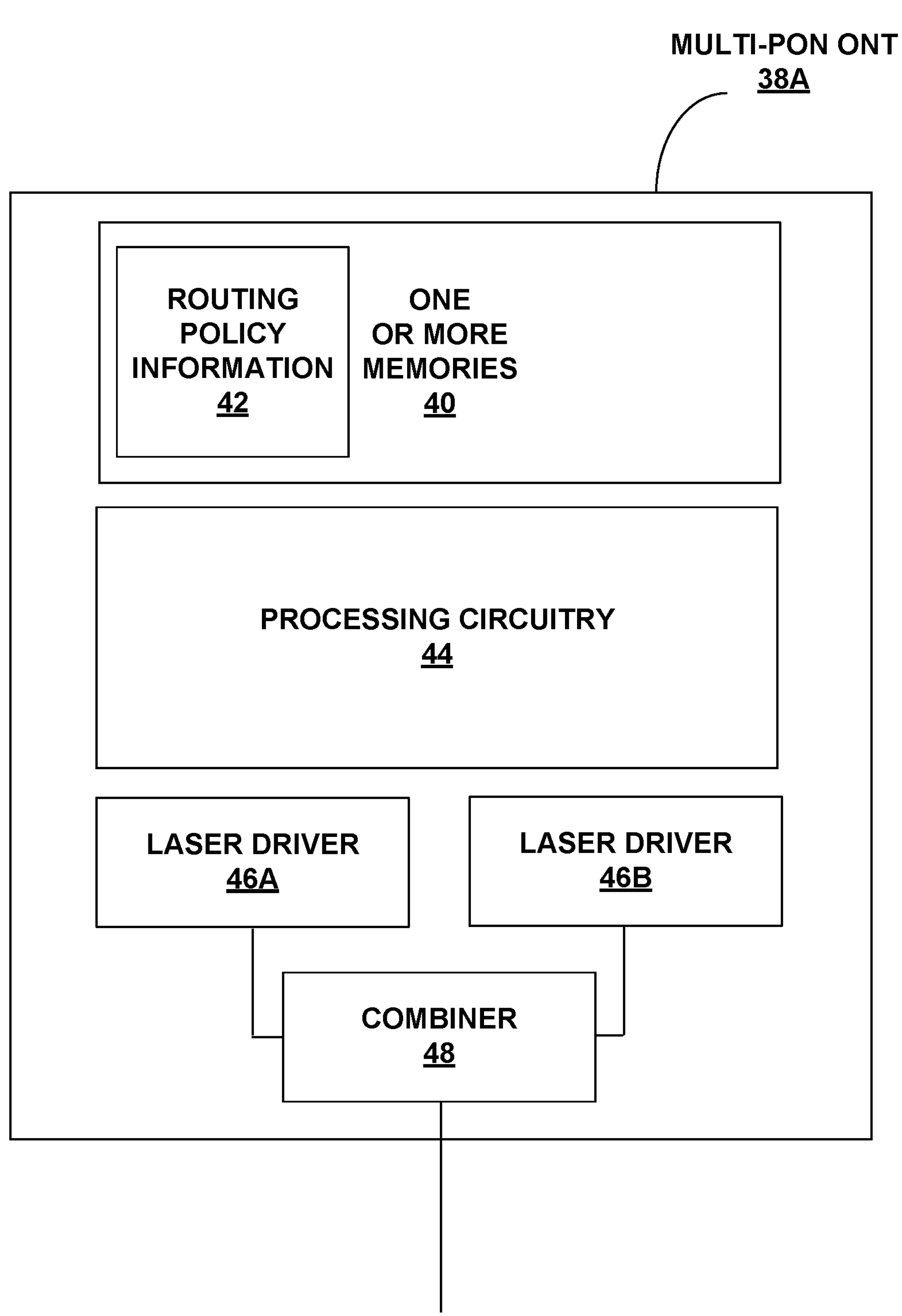
FIGS. 4A and 4B are block diagrams illustrating examples of an optical network terminal (ONT).
Figure 4B:
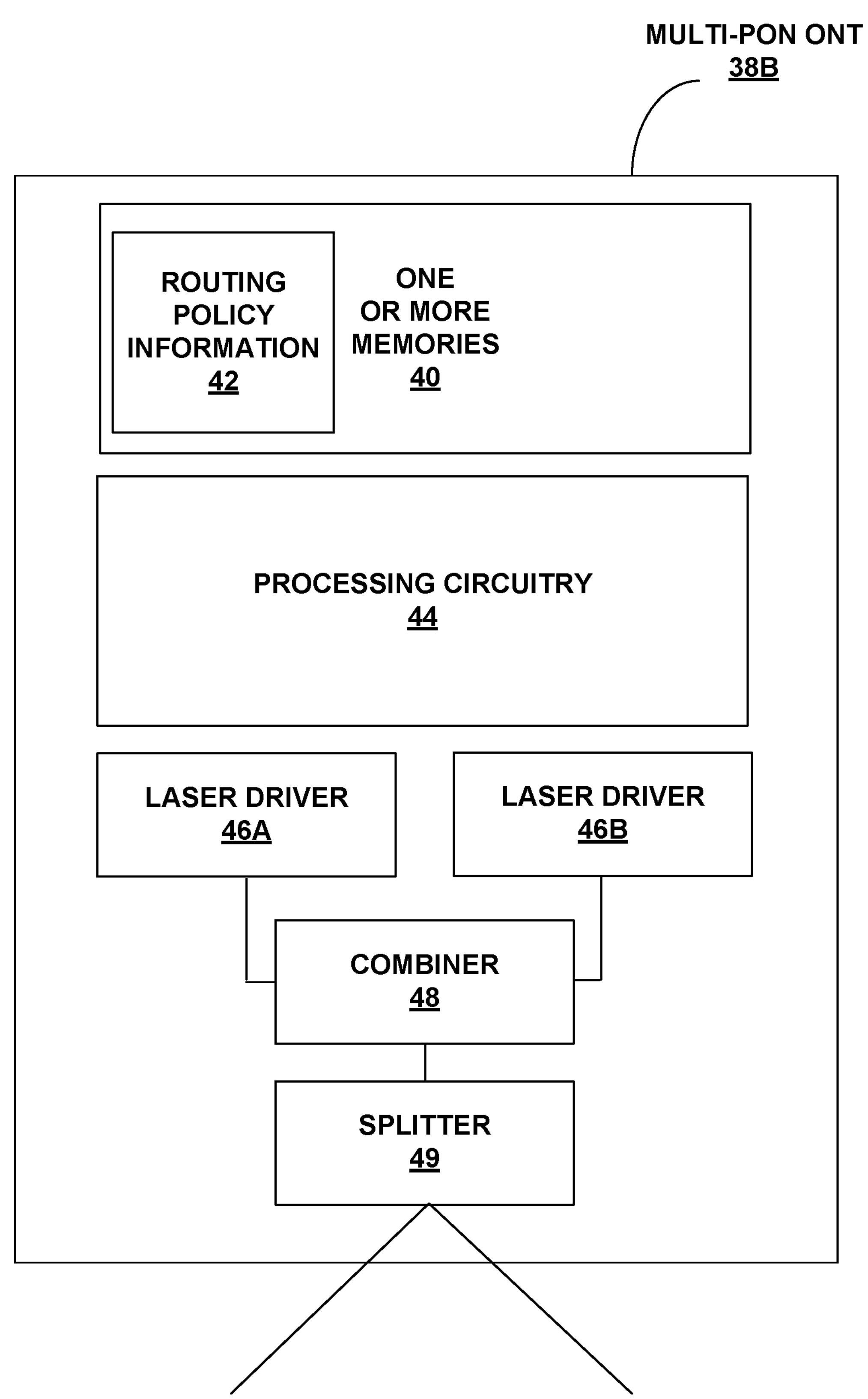

FIGS. 4A and 4B are block diagrams illustrating examples of an optical network terminal (ONT). For instance, FIG. 4A illustrates multi-PON ONT 38A, which is an example of multi-PON ONT 26A or 26B of FIGS. 2A and 2B. FIG. 4B illustrates multi-PON ONT 38B, which is an example of multi-PON ONT 26A or 26B of FIGS. 3A and 3B.

Multi-PON ONTs 38A and 38B may be configured to aggregate bandwidth of different PON protocols. For instance, as described above, if a first PON protocol is GPON and a second PON protocol is XGS-PON, then it may be possible for multi-PON ONTs 38A and 38B to support a total of 12.5 Gbps downstream and 11.25 Gbps upstream.

In one or more examples, multi-PON ONTs 38A and 38B may be configured to leverage the aggregation of bandwidth of different PON protocols to implement a policy for balancing load between the different PON protocols. For instance, as illustrated in FIGS. 4A and 4B, multi-PON ONTs 38A and 38B include one or more memories 40. One or more memories 40 may include any of a variety of distributed or locally accessed data storage media such as a hard drive, flash memory, volatile or non-volatile memory, or any other suitable digital storage media for storing encoded video data. Some examples of one or more memories include dynamic random access memory (DRAM), including synchronous DRAM (SDRAM), magnetoresistive RAM (MRAM), resistive RAM (RRAM), or other types of memory devices.

One or more memories 40 store routing policy information 42. Routing policy information 42 may include information indicative of which PON protocol multi-PON ONTs 38A or 38B should utilize to transmit a particular set of information. For example, routing policy information 42 may define a priority level (e.g., in a look-up table) for the set of information. In routing policy information 42, information from particular subscriber devices or particular users may be given a higher priority than information from other subscriber devices or other users. As an example, information from a laptop may be given a higher priority than information from a thermostat. In one or more examples, each of the plurality of PON protocols support different bandwidths, and the routing policy information 42 may indicate that information having relatively higher priority be transmitted using a PON protocol having a relatively higher bandwidth (e.g., use XGS-PON for higher priority information, and use GPON for lower priority information).

In one or more examples, processing circuitry 44 of multi-PON ONT 38A or 38B may be configured to determine which PON protocol to use based on the priority level as indicated in routing policy information 42. Processing circuitry 44 may be a fixed-function circuit, a programmable circuit, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Processing circuitry 44 may include arithmetic logic units (ALUs), elementary function units (EFUs), digital circuits, analog circuits, and/or programmable cores formed from programmable circuits. In examples where the operations of processing circuitry 44 are performed by software executing on the programmable circuits, on-chip or off-chip memory may store instructions (e.g., object code) of the software that processing circuitry 44 receives and executes.

Multi-PON ONTs 38A and 38B include laser driver 46A and laser driver 46B. In one or more examples, laser driver 46A may be configured to output information in accordance with the first PON protocol, and laser driver 46B may be configured to output information in accordance with the second PON protocol. In the example of FIG. 4A, combiner 48 may combine the outputs from laser driver 46A and laser driver 46B for outputting to splitter/combiner 20 of FIG. 2A or 2B. In the example of FIG. 4B, combiner 48 may output to splitter 49, and splitter 49 may output to splitter/combiner 30A and to splitter/combiner 30B of FIGS. 3A and 3B.

Accordingly, processing circuitry 44 may receive a set of information from a subscriber device, and determine a priority level of the set of information based on the routing policy information 42. In one or more examples, processing circuitry 44 may select a first PON protocol from a plurality of PON protocols based on the priority level of the set of information for transmission of the set of information. For instance, multi-PON ONTs 38A and 38B may be configurable to communicate in accordance with a first PON protocol and in accordance with a second PON protocol on a same fiber optical link. In the example of multi-PON ONT 38B, multi-PON ONT 38B can still transmit in accordance with the first PON protocol and in accordance with the second PON protocol on the same fiber optical link, but does so for two fibers. That is, the output of splitter 49 is two fiber optical links, and each of the two fiber optical links includes information in accordance with the first PON protocol and in accordance with the second PON protocol. In the above example, multi-PON ONTs 38A and 38B may be configurable to communicate using the first PON protocol and the second PON protocol, but processing circuitry 44 may select the first PON protocol for transmitting the set of information based on the priority level of the set of information (e.g., as indicated by routing policy information 42).

Processing circuitry 44 may then cause transmission of the set of information on a fiber optical link in accordance with the first PON protocol. For example, processing circuitry 44 may cause laser driver 46A to transmit the set of information in accordance with the first PON protocol.

In the above example, assume that the set of information is a first set of information, and the subscriber device is a first subscriber device. In some examples, processing circuitry 44 may be configured to receive a second set of information from a second subscriber device, and determine a priority level of the second set of information based on the routing policy information 42.

In this case, processing circuitry 44 may select a second PON protocol from the plurality of PON protocols based on the priority level of the second set of information for transmission of the second set of information. Processing circuitry 44 may cause transmission of the second set of information on the same fiber optical link, used for transmission of the first set of information, in accordance with the second PON protocol. For example, processing circuitry 44 may cause laser driver 46B to transmit the second set of information in accordance with the second PON protocol. Combiner 48 may combine the first set of information and the second set of information for transmission on the same fiber optical link to splitter/combiner 20. In one or more examples, the first set of information and the second set of information are transmitted at overlapping times on the same fiber optical link.

The above example is described for Type B redundancy. The following example is for Type C redundancy.

Like above, processing circuitry 44 may receive a second set of information from a second subscriber device, determine a priority level of the second set of information based on the routing policy information 42, and select a second PON protocol from the plurality of PON protocols based on the priority level of the second set of information for transmission of the second set of information. In this example, processing circuitry 44 may cause transmission of the first set of information on a first fiber optical link in accordance with the first PON protocol to a first splitter/combiner 30A, and cause transmission of the first set information on a second fiber optical link in accordance with the first PON protocol to a second splitter/combiner 30B. For instance, as illustrated in FIG. 4B, the output of splitter 49 is two fiber optical links. The first fiber optical link may carry the first set of information in accordance with the first PON protocol to splitter/combiner 30A, and the second fiber optical link may carry the first set of information in accordance with the first PON protocol to splitter/combiner 30B.

Moreover, processing circuitry 44 may cause transmission of the second set of information on the first fiber optical link in accordance with the second PON protocol to the first splitter/combiner. Processing circuitry 44 may also cause transmission of the second set of information on the second fiber optical link in accordance with the second PON protocol to the second splitter/combiner. For example, as illustrated in FIG. 4B, the output of splitter 49 is two fiber optical links. The first fiber optical link may carry the second set of information in accordance with the second PON protocol to splitter/combiner 30A, and the second fiber optical link may carry the second set of information in accordance with the second PON protocol to splitter/combiner 30B.

Accordingly, in some examples, a first fiber optical link from splitter 49 of multi-PON ONT 38B may carry the first set of information in accordance with the first PON protocol and carry the second set of information in accordance with the second PON protocol to splitter/combiner 30A. Also, a second fiber optical link from splitter 49 of multi-PON ONT 38B may carry the first set of information in accordance with the first PON protocol and carry the second set of information in accordance with the second PON protocol to splitter/combiner 30B. The first set of information and the second set of information may be transmitted at overlapping times on the first fiber optical link and the second fiber optical link. In response to a communication failure on the second fiber optical link (e.g., fiber cut to splitter/combiner 30B), the processing circuitry 44 may be configured to cause transmit the second set of information on the same first fiber optical link in accordance with the second PON protocol to the first splitter/combiner.

Figure 5A:
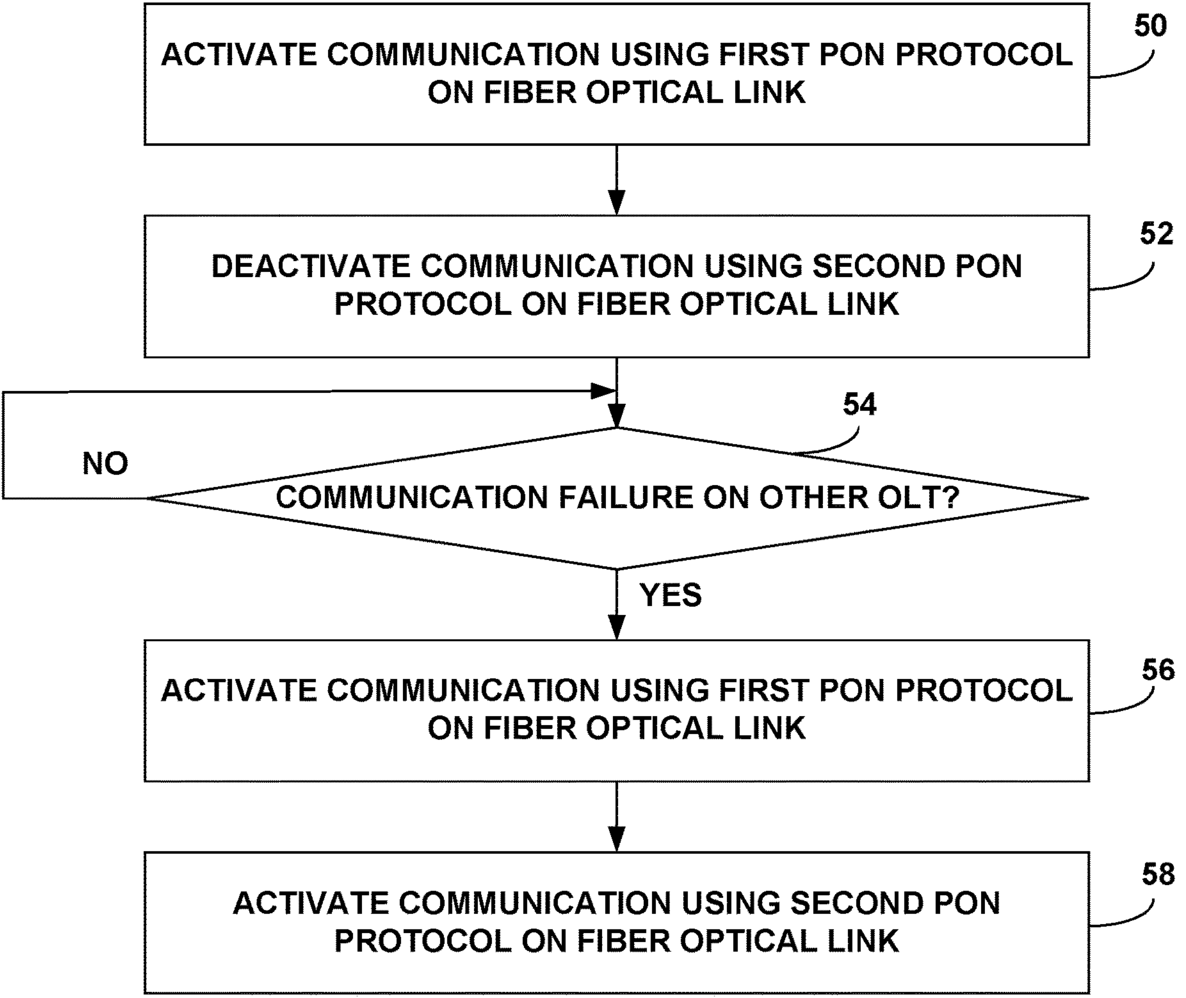
FIGS. 5A and 5B are flowcharts illustrating examples of techniques in accordance with one or more examples described in this disclosure.
Figure 5B:
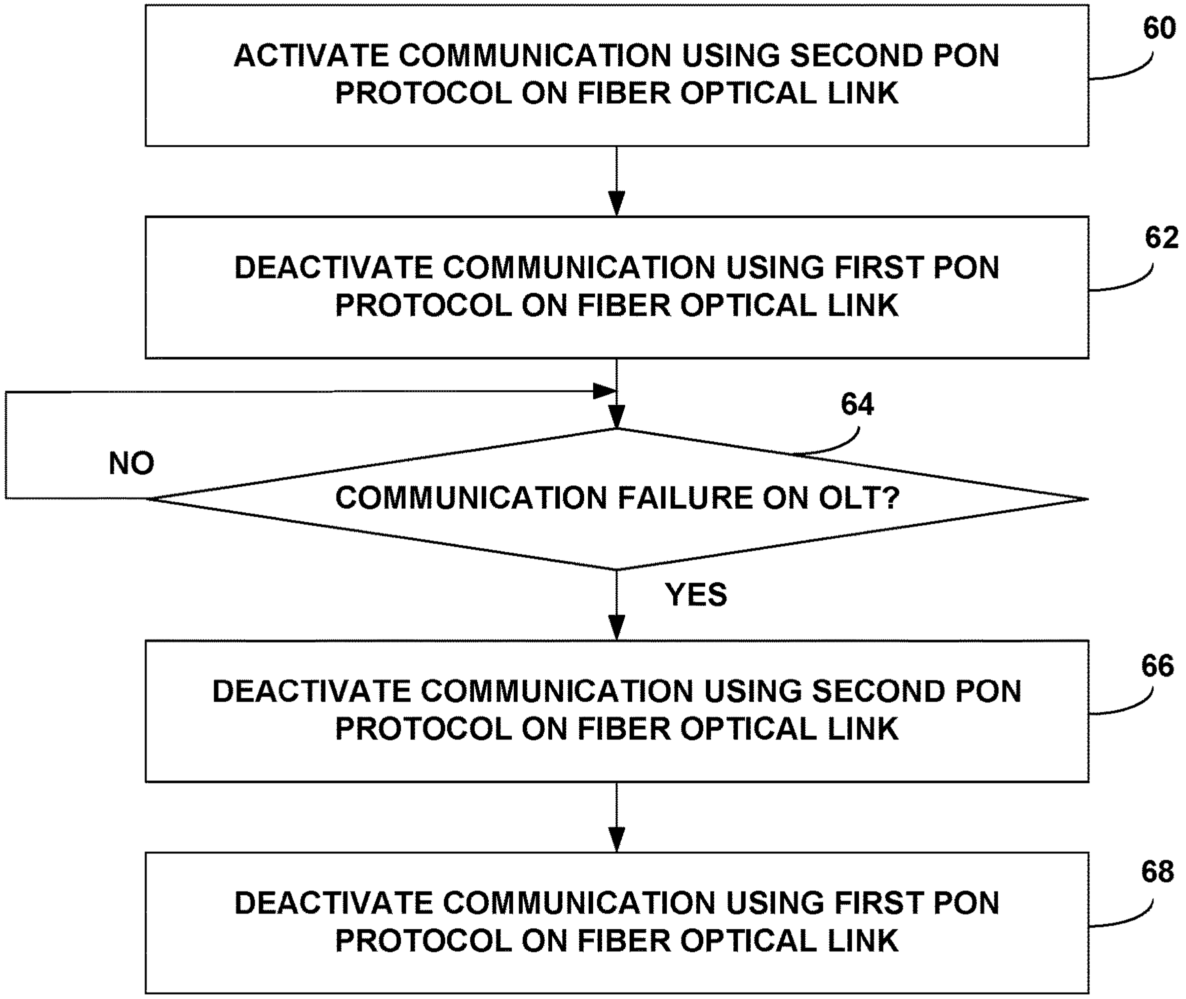

FIGS. 5A and 5B are flowcharts illustrating examples of techniques in accordance with one or more examples described in this disclosure. For ease, the example of FIGS. 5A and 5B are described with respect to FIGS. 1A, 1B, 2A, 2B, 3A, and 3B.

In FIG. 5A, in a first configuration, multi-PON transceiver 16A may be configured to activate communication using a first PON protocol on fiber optical link 18A (50). Multi-PON transceiver 16A may deactivate communication using the second PON protocol on fiber optical link 18A (52).

OLT 12A or OLT 12B may determine if there is a communication failure in OLT 12B (54). If there is no communication failure (NO of 54), OLT 12A and OLT 12B may remain in the first configuration until there is a communication failure. However, if there is a communication failure (YES of 54), OLT 12A may transition to the second configuration.

In the second configuration, multi-PON transceiver 16A may be configured to activate communication using the first PON protocol on fiber optical link 18A (56). Multi-PON transceiver 16A may also be configured to activate communication using second PON protocol on fiber optical link 18A (58). Multi-PON transceiver 16A may activate the first PON protocol and the second PON protocol on fiber optical link 18A at the same time, overlapping times, or at different times.

In FIG. 5B, in a first configuration, multi-PON transceiver 16B may be configured to activate communication using a second PON protocol on fiber optical link 18B (60). Multi-PON transceiver 16B may deactivate communication using the first PON protocol on fiber optical link 18B (62).

OLT 12A or OLT 12B may determine if there is a communication failure in OLT 12B (64). If there is no communication failure (NO of 64), OLT 12A and OLT 12B may remain in the first configuration until there is a communication failure. However, if there is a communication failure (YES of 64), OLT 12B may transition to the second configuration.

In the second configuration, multi-PON transceiver 16B may be configured to deactivate communication using the first PON protocol on fiber optical link 18B (66). Multi-PON transceiver 16B may also be configured to deactivate communication using second PON protocol on fiber optical link 18B (68).

Figure 6:
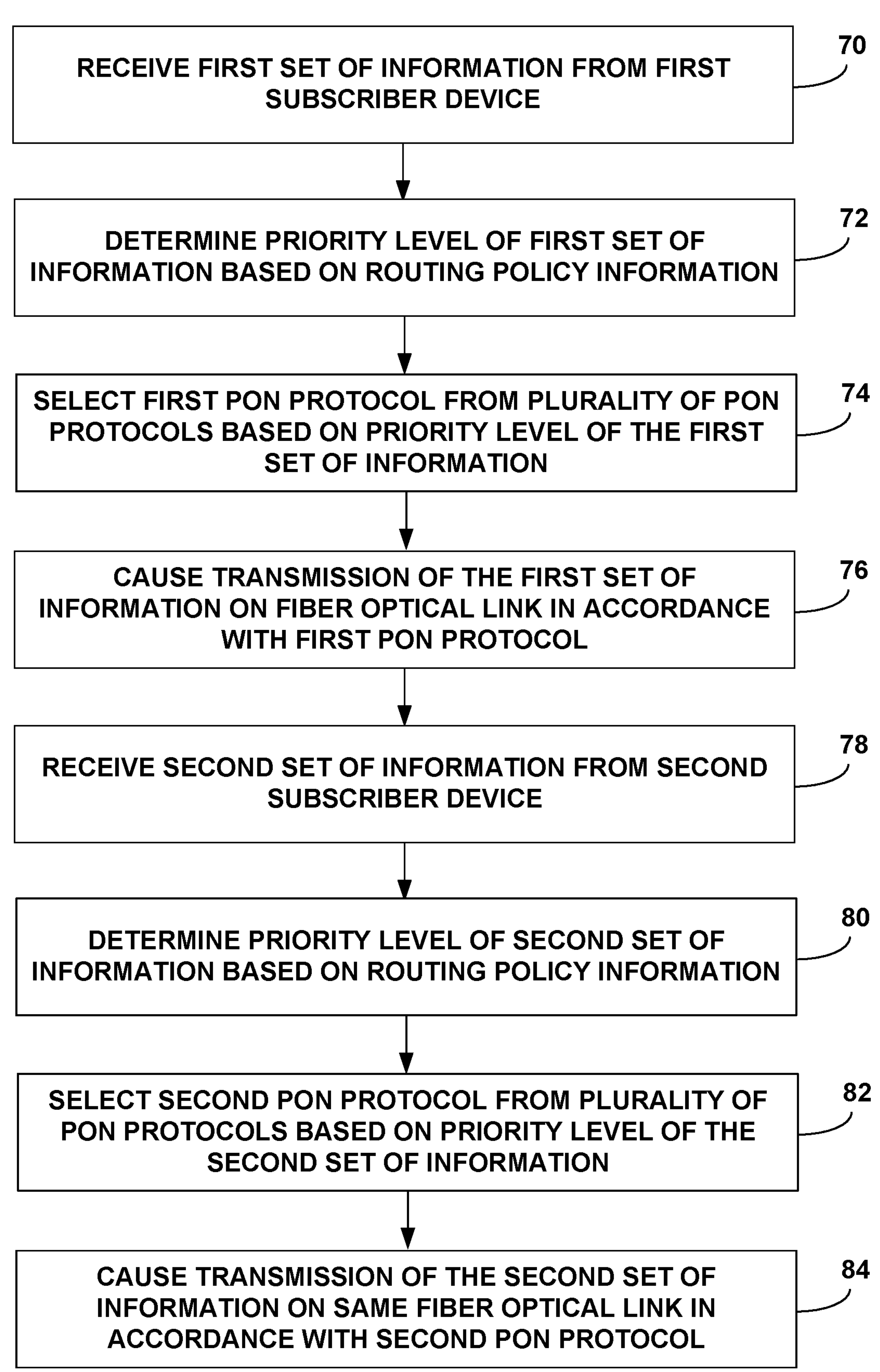
FIG. 6 is a flowchart illustrating examples of techniques in accordance with one or more examples described in this disclosure.

FIG. 6 is a flowchart illustrating examples of techniques in accordance with one or more examples described in this disclosure. For ease, the example of FIG. 6 is described with respect to FIGS. 4A and 4B.

Processing circuitry 44 may receive first set of information from first subscriber device (70). Processing circuitry 44 may determine a priority level of the first set of information based on routing policy information 42 (72). As explained above, each of the plurality of PON protocols may support different bandwidths, and the routing policy information 42 may indicate that information having relatively higher priority be transmitted using a PON protocol having a relatively higher bandwidth. Processing circuitry 44 may select first PON protocol from the plurality of PON protocols based on the priority level of the first set of information (74). Processing circuitry 44 may then cause transmission of the first set of information on the fiber optical link in accordance with the first PON protocol (76).

Processing circuitry 44 may receive second set of information from second subscriber device (78). Processing circuitry 44 may determine a priority level of the second set of information based on routing policy information 42 (80). Processing circuitry 44 may select second PON protocol from the plurality of PON protocols based on the priority level of the second set of information (82). Processing circuitry 44 may then cause transmission of the second set of information on the same fiber optical link as the first set of information in accordance with the second PON protocol (84).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., processing circuitry 44), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system for passive optical network (PON) communication, the system comprising:
- an optical network terminal comprising:
  - one or more memories configured to store routing policy information; and
  - processing circuitry coupled to the one or more memories and configured to:
    - receive a first set of information from a first subscriber device;
    - determine a priority level of the first set of information based on the routing policy information;
    - select a first PON protocol from a plurality of PON protocols based on the priority level of the first set of information for transmission of the first set of information;
    - cause transmission of the first set of information on a fiber optical link in accordance with the first PON protocol;
    - receive a second set of information from a second subscriber device;
    - determine a priority level of the second set of information based on the routing policy information;
    - select a second PON protocol from the plurality of PON protocols based on the priority level of the second set of information for transmission of the second set of information; and
    - cause transmission of the second set of information on the same fiber optical link, used for transmission of the first set of information, in accordance with the second PON protocol.

2. The system of claim 1, wherein the first set of information and the second set of information are transmitted at overlapping times on the same fiber optical link.

3. The system of claim 1, wherein each of the plurality of PON protocols support different bandwidths, and wherein the routing policy information indicates that information having relatively higher priority be transmitted using a PON protocol having a relatively higher bandwidth.

4. The system of claim 1, wherein the plurality of PON protocols comprises two or more of gigabit PON (GPON), 10 gigabit PON (XG-PON), 10 gigabit symmetrical PON (XGS-PON), 50 gigabit PON (50G-PON), 100 gigabit PON (100G-PON), and coherent PON.

5. A method for communicating in a passive optical network (PON) system, the method comprising:
receiving, with an optical network terminal (ONT), a first set of information from a first subscriber device;
determining, with the ONT, a priority level of the first set of information based on routing policy information stored on the ONT;
selecting, with the ONT, a first PON protocol from a plurality of PON protocols based on the priority level of the first set of information for transmission of the first set of information;
causing, with the ONT, transmission of the first set of information on a fiber optical link in accordance with the first PON protocol;
receiving, with the ONT, a second set of information from a second subscriber device;
determining, with the ONT, a priority level of the second set of information based on the routing policy information;
selecting, with the ONT, a second PON protocol from the plurality of PON protocols based on the priority level of the second set of information for transmission of the second set of information; and
causing, with the ONT, transmission of the second set of information on the same fiber optical link, used for transmission of the first set of information, in accordance with the second PON protocol.

6. The method of claim 5, wherein the first set of information and the second set of information are transmitted at overlapping times on the same fiber optical link.

7. The method of claim 5, wherein each of the plurality of PON protocols support different bandwidths, and wherein the routing policy information indicates that information having relatively higher priority be transmitted using a PON protocol having a relatively higher bandwidth.

8. The method of claim 5, wherein the plurality of PON protocols comprises two or more of gigabit PON (GPON), 10 gigabit PON (XG-PON), 10 gigabit symmetrical PON (XGS-PON), 50 gigabit PON (50G-PON), 100 gigabit PON (100G-PON), and coherent PON.

9. A computer-readable storage medium storing instructions thereon that when executed cause one or more processors of an optical network terminal (ONT) to:
receive a first set of information from a first subscriber device;
determine a priority level of the first set of information based on routing policy information;
select a first PON protocol from a plurality of PON protocols based on the priority level of the first set of information for transmission of the first set of information;
cause transmission of the first set of information on a fiber optical link in accordance with the first PON protocol;
receive a second set of information from a second subscriber device;
determine a priority level of the second set of information based on the routing policy information;
select a second PON protocol from the plurality of PON protocols based on the priority level of the second set of information for transmission of the second set of information; and
cause transmission of the second set of information on the same fiber optical link, used for transmission of the first set of information, in accordance with the second PON protocol.

10. The computer-readable storage medium of claim 9, wherein the first set of information and the second set of information are transmitted at overlapping times on the same fiber optical link.

11. The computer-readable storage medium of claim 9, wherein each of the plurality of PON protocols support different bandwidths, and wherein the routing policy information indicates that information having relatively higher priority be transmitted using a PON protocol having a relatively higher bandwidth.

12. A system for passive optical network (PON) communication, the system comprising:
an optical network terminal comprising:
one or more memories configured to store routing policy information; and
processing circuitry coupled to the one or more memories and configured to:
receive a first set of information from a first subscriber device;
determine a priority level of the first set of information based on the routing policy information;
select a first PON protocol from a plurality of PON protocols based on the priority level of the first set of information for transmission of the first set of information;
receive a second set of information from a second subscriber device;
determine a priority level of the second set of information based on the routing policy information;
select a second PON protocol from the plurality of PON protocols based on the priority level of the second set of information for transmission of the second set of information;
cause transmission of the first set of information on a first fiber optical link in accordance with the first PON protocol to a first splitter/combiner;
cause transmission of the first set of information on a second fiber optical link in accordance with the first PON protocol to a second splitter/combiner;
cause transmission of the second set of information on the second fiber optical link in accordance with the second PON protocol to the second splitter/combiner; and
cause transmission of the second set of information on the first fiber optical link in accordance with the second PON protocol to the first splitter/combiner.

13. The system of claim 12, wherein the first set of information and the second set of information are transmitted at overlapping times on the first fiber optical link and the second fiber optical link.

14. A method for communicating in a passive optical network (PON) system, the method comprising:
receiving, with an optical network terminal (ONT), a first set of information from a first subscriber device;
determining, with the ONT, a priority level of the first set of information based on routing policy information stored on the ONT;
selecting, with the ONT, a first PON protocol from a plurality of PON protocols based on the priority level of the first set of information for transmission of the first set of information;
receiving, with the ONT, a second set of information from a second subscriber device;
determining, with the ONT, a priority level of the second set of information based on the routing policy information;

selecting, with the ONT, a second PON protocol from the plurality of PON protocols based on the priority level of the second set of information for transmission of the second set of information;

causing, with the ONT, transmission of the first set of information on a first fiber optical link in accordance with the first PON protocol to a first splitter/combiner causing, with the ONT, transmission of the first set of information on a second fiber optical link in accordance with the first PON protocol to a second splitter/combiner;

causing, with the ONT, transmission of the second set of information on the second fiber optical link in accordance with the second PON protocol to the second splitter/combiner; and causing, with the ONT, transmission of the second set of information on the first fiber optical link in accordance with the second PON protocol to the first splitter/combiner.

15. The method of claim 14, wherein the first set of information and the second set of information are transmitted at overlapping times on the first fiber optical link and the second fiber optical link, respectively.

* * * * *